July 18, 1933.   J. S. DREWRY   1,919,096

VEHICLE BODY WITH DETACHABLE CONTAINERS

Filed Dec. 20, 1930

INVENTOR

James S. Drewry,

BY

ATTORNEY

Patented July 18, 1933

1,919,096

UNITED STATES PATENT OFFICE

JAMES SIDNEY DREWRY, OF LETCHWORTH, ENGLAND, ASSIGNOR OF ONE-HALF TO SHELVOKE & DREWRY LIMITED, OF LETCHWORTH, ENGLAND

VEHICLE BODY WITH DETACHABLE CONTAINERS

Application filed December 20, 1930, Serial No. 503,810, and in Great Britain January 4, 1930.

This invention relates to apparatus for facilitating the transport and disposition of household refuse or similar material which is accumulated in small bins or containers and in particular to apparatus of this kind in which the bins are secured upon a reversible platform mounted upon a vehicle chassis in such manner that the bins can be emptied without the necessity of removing them from the platform.

According to the invention the bins are loaded on a substantially flat platform which is adapted to fit on a vehicle frame and is provided with sling eyes or the like whereby it may be lifted from the frame. Means are provided whereby the bins are secured to the platform when it is inverted, while they are readily removable from the platform for unloading.

Figure 1:
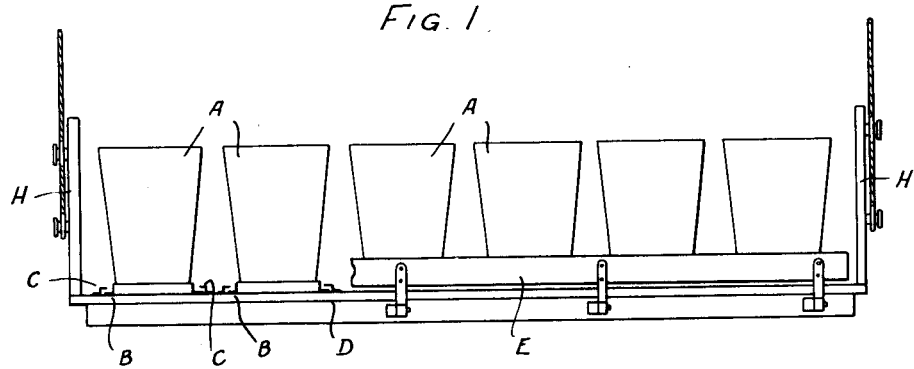
Fig. 1 is a side elevation of the invention.
Figure 2:
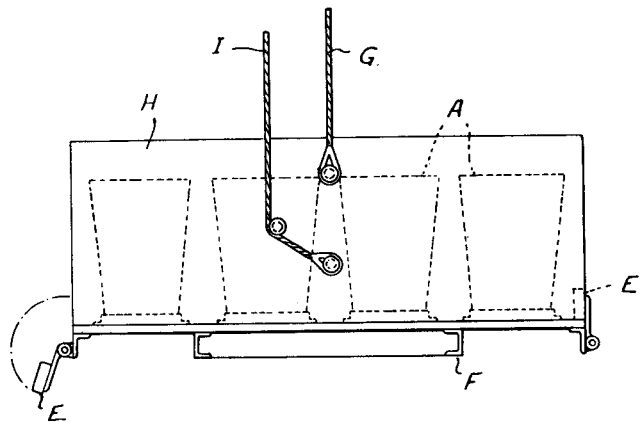
Fig. 2 is an end elevation of the invention.

One method of carrying the invention into effect is illustrated in side and end elevation respectively in Figs. 1 and 2 of the accompanying drawing. As shown therein, the bins or containers A are of truncated cone shape and are provided at their lower and smaller ends with a flange B (or equivalent metal strip or strips) which engages with retaining strips C rigidly fixed upon the upper surface of the platform D.

The sides of this platform are provided with horizontally hinged keep boards E which are turned down, as indicated at the left hand of Fig. 2, to enable the bins to be slid into position on the platform as shown in Fig. 1, the board E being then raised and secured in the raised position.

The platform D is adapted to fit on a vehicle frame indicated at F, and when the platform loaded with bins has been transported to the central or dumping position for disposal of the refuse or the like, the platform is raised off the chassis and is then inverted by any suitable means, so that the contents of the bins are discharged while the bins themselves are retained hanging from the inverted platform.

As indicated in the drawing, the platform may be raised off the chassis by any suitable mechanical means operating through ropes or a sling G attached to the vertical end members H on the platform D, and when the vehicle chassis is withdrawn the platform may then be inverted by means of another rope or sling, indicated at I, attached to the end members H at points lower than the point of attachment of the sling G.

The bins are sometimes provided with hinged lids, and in this case means are provided to insure that the bins can only be loaded on the platform in one predetermined position, say with all the lids of the bins opening in the same direction.

The vertical end members H are preferably somewhat higher than the bins carried on the platform, so that two or more platforms may be superposed when loaded with their complement of bins, thereby forming a nest of units, means being provided for locking the platforms together to prevent relative movement when in transit on a vehicle frame, and to enable two or more platforms to be lifted and inverted simultaneously by means of the slings G, I.

Also the locking strips E may be replaced by hinged sides of the same depth as the fixed ends H, so that when these sides are raised and secured in position to hold the bins, the platform with its two ends and two hinged sides would form an open-topped box.

Instead of arranging for the bins A to be slid upon the frame to engage retaining strips secured thereto, they may be lowered upon the platform and held against its base by spring clips engaging over the upper edge of the bins, or the bins may be secured to the platform by any other suitable means which will render them readily removable when required, but will hold them to the platform when the latter is inverted.

Although the bins shown in the drawing are of a truncated cone shape, they may be of square, cylindrical or of any other suitable form.

Having thus described the nature of the said invention and the best means I know of carrying the same into practical effect, I claim:—

1. Apparatus for disposing of refuse or other materials accumulated in bins or containers, comprising a platform adapted to fit on a vehicle frame and to be removed therefrom, bin-engaging means carried by the platform for securing the bins to the platform during transport and when the platform is inverted, and means also carried by the platform for preventing detachment of bins from said bin-engaging means during the inversion of the platform.

2. Apparatus for the transport and disposal of refuse or other materials accumulated in bins or containers, comprising in combination a vehicle chassis, a substantially flat platform adapted to fit on said chassis, bin-engaging means carried by the platform for securing the bins thereto during transport and when the platform is inverted, means also carried by the platform and preventing detachment of the bins from said bin-engaging means during inversion of the platform, and means fitted to the platform whereby it may be lifted from the chassis and tilted by means external to the vehicle.

3. Apparatus for the transport and disposal of refuse or other materials accumulated in bins or containers, comprising in combination a vehicle chassis, a substantially flat platform adapted to fit on said chassis, bin-engaging means carried by the platform for securing the bins thereto during transport and when the platform is inverted, upstanding members rigid with said platform and slings attached to said members whereby said platform may be lifted from the chassis and tilted by means external to the vehicle.

JAMES SIDNEY DREWRY.